(12) United States Patent
Miki et al.

(10) Patent No.: US 9,784,900 B2
(45) Date of Patent: Oct. 10, 2017

(54) DISPLAY DEVICE

(71) Applicant: Japan Display Inc., Minato-ku (JP)

(72) Inventors: Hirohisa Miki, Tokyo (JP); Shigesumi Araki, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/217,163

(22) Filed: Jul. 22, 2016

(65) Prior Publication Data

US 2017/0023721 A1    Jan. 26, 2017

(30) Foreign Application Priority Data

Jul. 24, 2015  (JP) .................................. 2015-146759

(51) Int. Cl.
| | |
|---|---|
| *F21V 7/04* | (2006.01) |
| *F21V 8/00* | (2006.01) |
| *G02F 1/1335* | (2006.01) |

(52) U.S. Cl.
CPC .......... *G02B 6/0026* (2013.01); *G02B 6/003* (2013.01); *G02B 6/0031* (2013.01); *G02B 6/0073* (2013.01); *G02F 1/133514* (2013.01)

(58) Field of Classification Search
CPC .... G02B 6/0026; G02B 6/0031; G02B 6/003; G02B 6/0073; G02F 1/133514
See application file for complete search history.

(56) References Cited

U.S. PATENT DOCUMENTS

| | | | | |
|---|---|---|---|---|
| 9,198,258 | B2* | 11/2015 | Kim ................... | G02F 1/133512 |
| 9,657,920 | B2* | 5/2017 | Ishino ....................... | F21V 9/16 |
| 2011/0309325 | A1 | 12/2011 | Park et al. | |
| 2013/0294107 | A1* | 11/2013 | Ohkawa ............ | G02F 1/133615 |
| | | | | 362/606 |
| 2014/0313771 | A1* | 10/2014 | Song .................... | G02B 6/0073 |
| | | | | 362/611 |
| 2015/0301260 | A1* | 10/2015 | York ..................... | F21V 7/0016 |
| | | | | 362/607 |
| 2016/0054501 | A1* | 2/2016 | Hikmet ................ | G02B 6/0003 |
| | | | | 362/606 |
| 2016/0370533 | A1* | 12/2016 | York .................... | G02B 6/0055 |

FOREIGN PATENT DOCUMENTS

JP        2011-258951          12/2011

* cited by examiner

*Primary Examiner* — Donald Raleigh
(74) *Attorney, Agent, or Firm* — Oblon, McClelland, Maier & Neustadt, L.L.P.

(57) ABSTRACT

According to one embodiment, an illumination device including a light source unit including a light-emitting element having a light-emitting surface, a reflective surface formed around the light-emitting surface and having higher optical reflectivity than the light-emitting surface, a wavelength conversion member which converts a wavelength of emitted light from the light-emitting surface, an optical member located between the light source unit and the wavelength conversion member and including a light path adjustment mechanism which guides, to the reflective surface, light returned from the wavelength conversion member to the light-emitting surface, and a lightguide opposed to the wavelength conversion member.

20 Claims, 6 Drawing Sheets

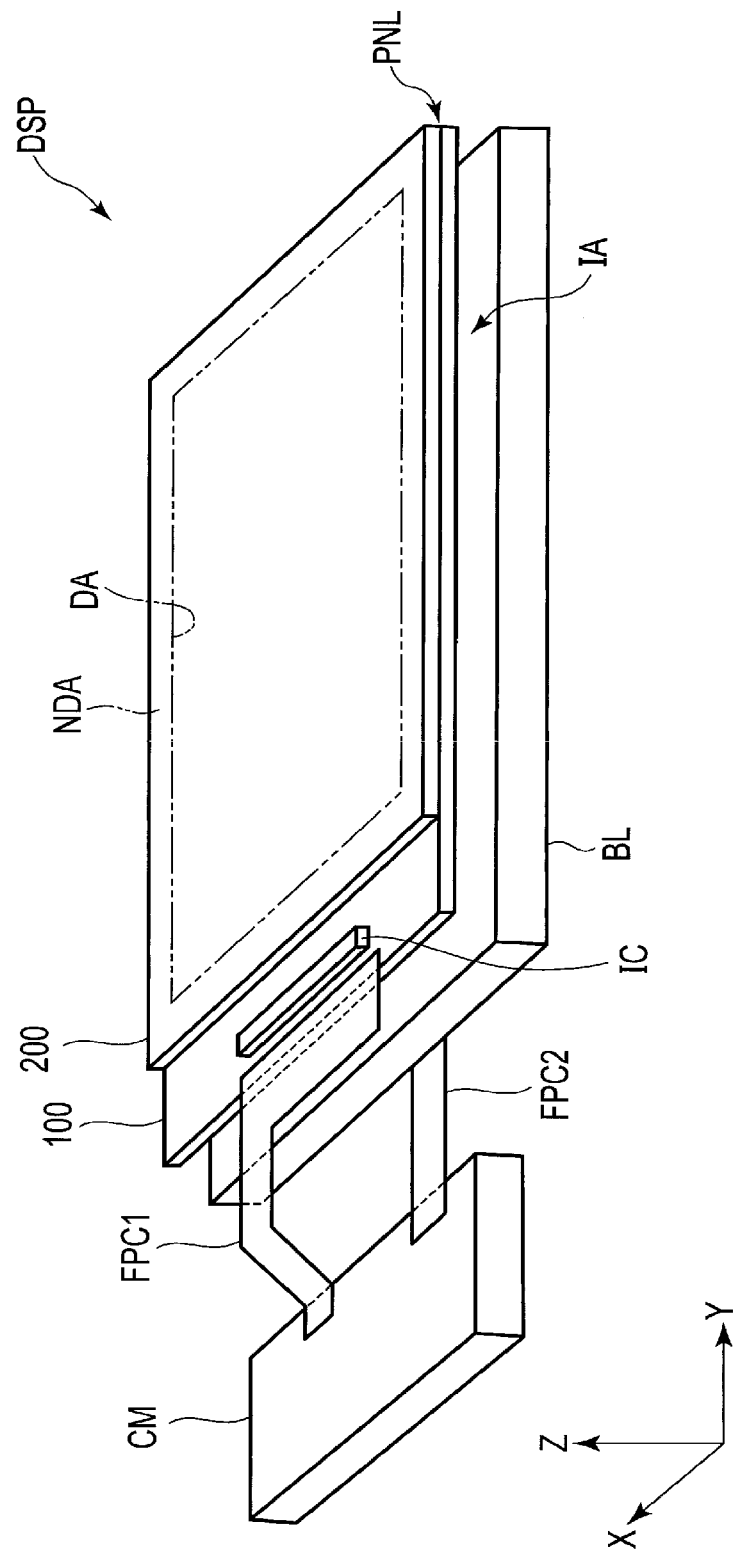
F I G. 1

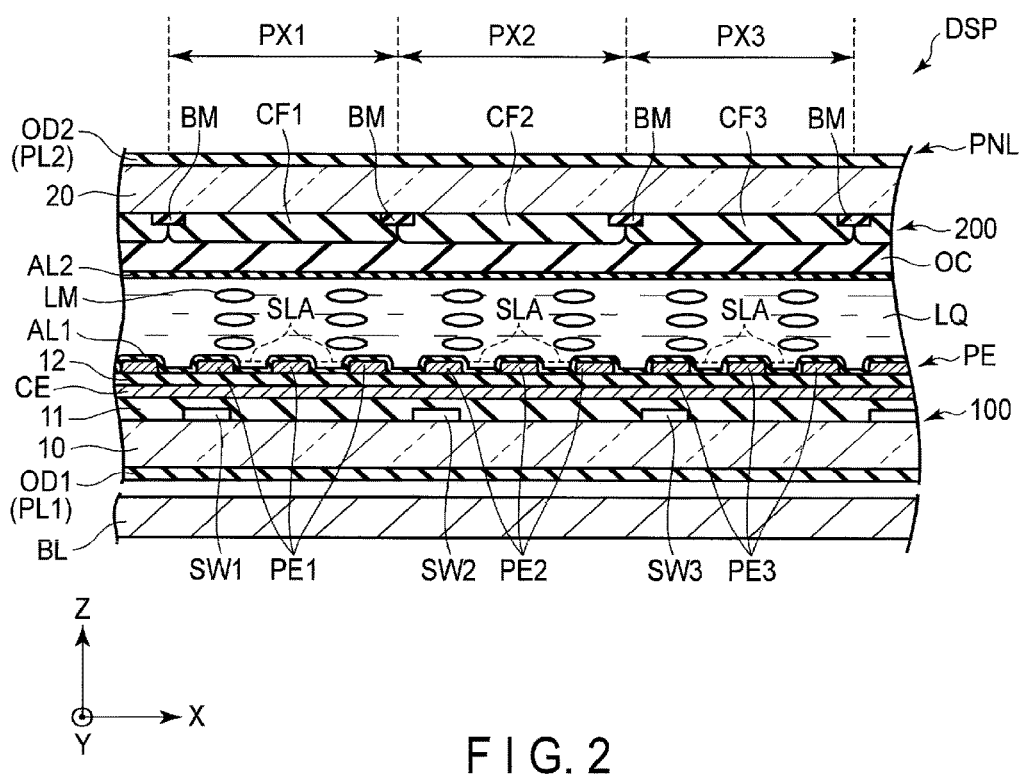
F I G. 2

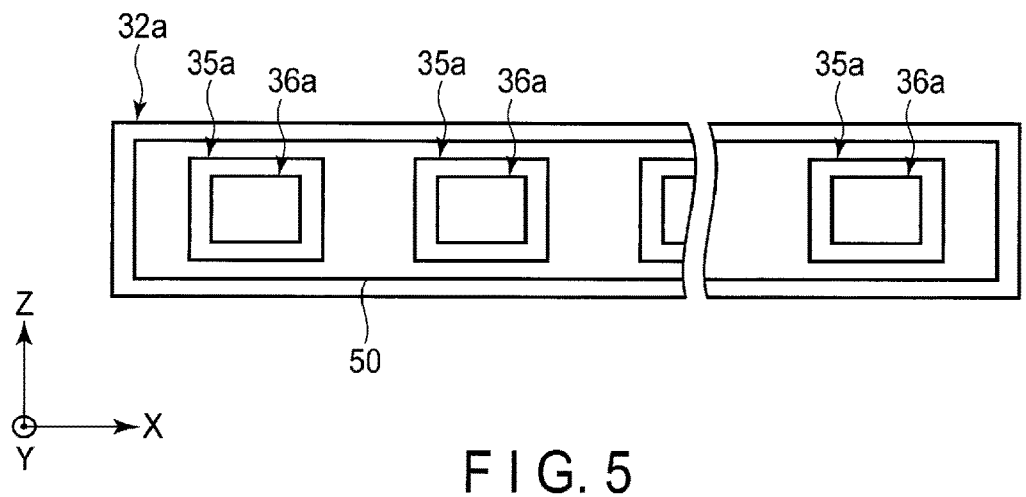
F I G. 5
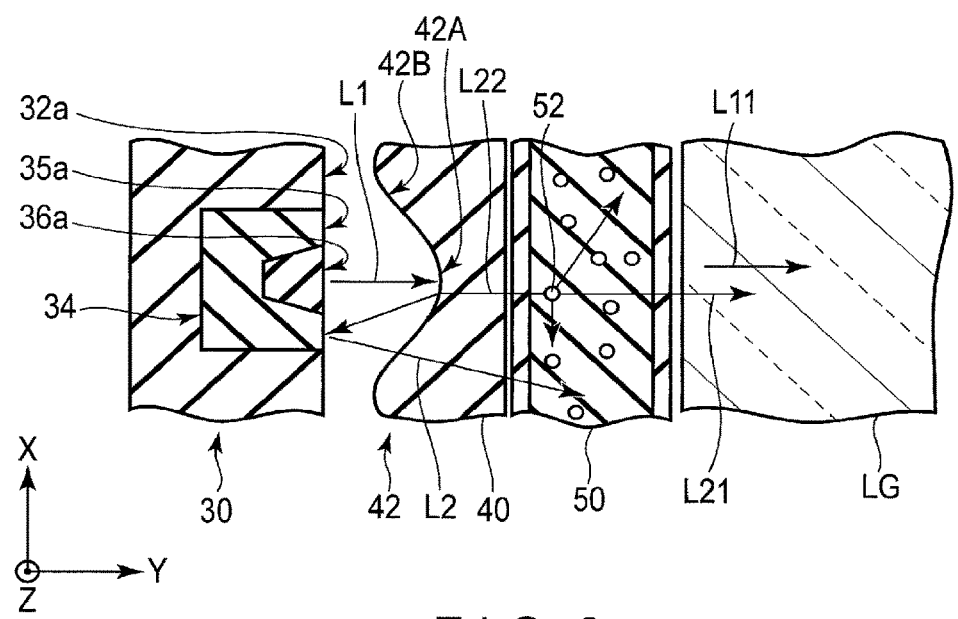
F I G. 6

DISPLAY DEVICE

CROSS-REFERENCE TO RELATED APPLICATIONS

This application is based upon and claims the benefit of priority from Japanese Patent Application No. 2015-146759, filed Jul. 24, 2015, the entire contents of which are incorporated herein by reference.

FIELD

Embodiments described herein relate generally to an illumination device and a display device.

BACKGROUND

As a backlight of a liquid crystal display device, an illumination device using a combination of light-emitting elements such as light-emitting diodes (LEDs) and a wavelength conversion member comprising a fluorescent material, etc., is used. For example, an illumination device comprising a light-emitting element package including a number of light-emitting chips and a quantum dot sealed package provided above the light-emitting element package in the direction of light emission is disclosed. The illumination device converts a wavelength of light emitted from the light-emitting chips and emits the wavelength-converted light.

A quantum dot (light-emitting material), which is a wavelength conversion material, generally emits light in all directions. Therefore, part of light emitted from quantum dots is directed to light-emitting chips, which may result in a decrease in light use efficiency.

BRIEF DESCRIPTION OF THE DRAWINGS

FIG. 1 is a schematic perspective view of a display device of the present embodiment.

FIG. 2 is a cross-sectional view of the display device.

FIG. 5 is an illustration of a positional relationship between a light source unit and a wavelength conversion member when viewed from a lightguide side.

FIG. 6 is an illustration of paths of light emitted from the wavelength conversion member.

DETAILED DESCRIPTION

Figure 3:
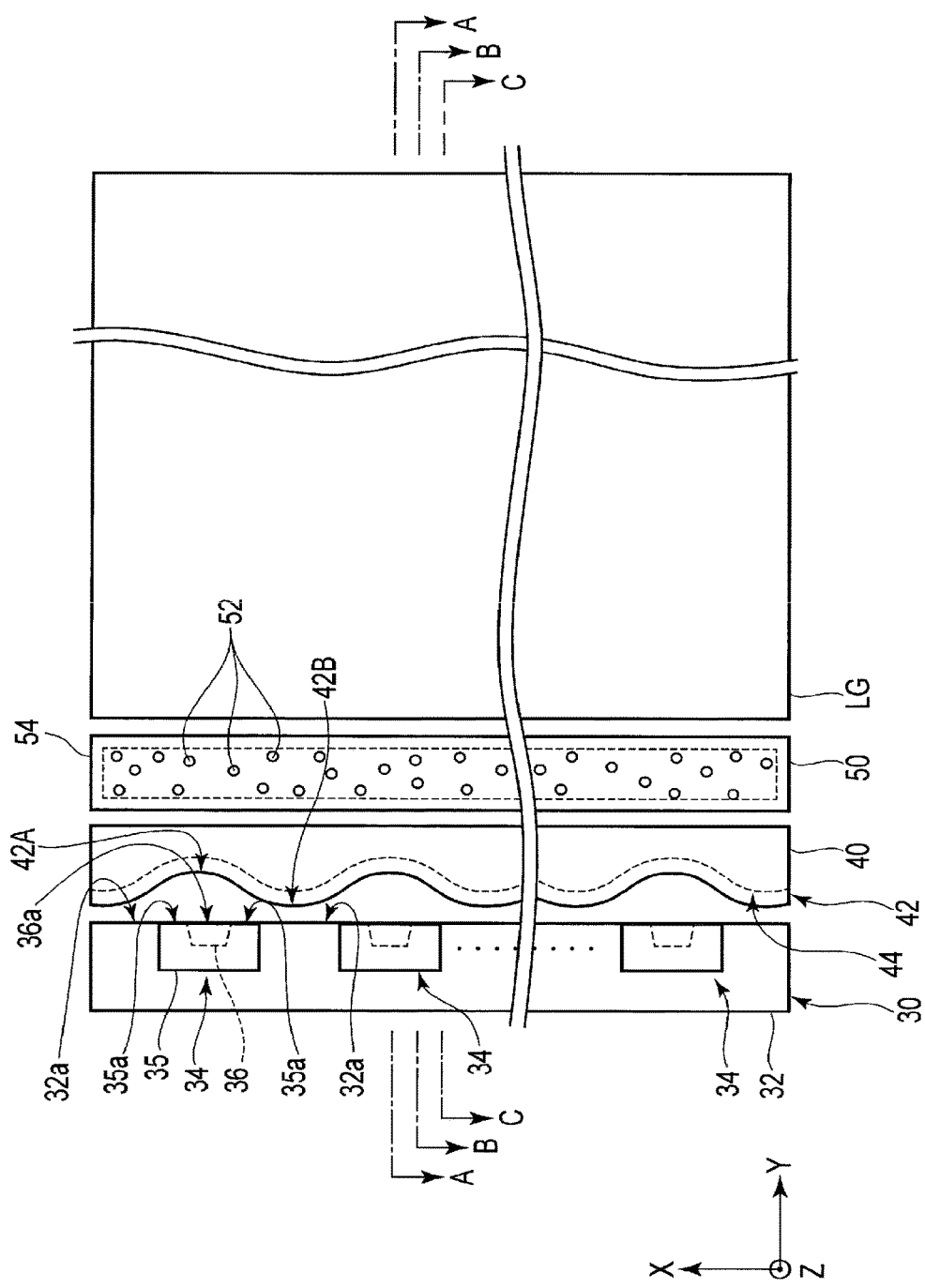
FIG. 3 is a plan view of a structure of an illumination device of the present embodiment.

In general, according to one embodiment, an illumination device comprising: a light source unit comprising a light-emitting element comprising a light-emitting surface; a reflective surface formed around the light-emitting surface and having higher optical reflectivity than the light-emitting surface; a wavelength conversion member which converts a wavelength of emitted light from the light-emitting surface; an optical member located between the light source unit and the wavelength conversion member and comprising a light path adjustment mechanism which guides, to the reflective surface, light returned from the wavelength conversion member to the light-emitting surface; and a lightguide opposed to the wavelength conversion member.

According to another embodiment, a display device comprising an illumination device and a display panel illuminated by the illumination device, wherein the illumination device comprises: a light source unit comprising a light-emitting element comprising a light-emitting surface; a reflective surface formed around the light-emitting surface and having higher optical reflectivity than the light-emitting surface; a wavelength conversion member which converts a wavelength of emitted light from the light-emitting surface; an optical member located between the light source unit and the wavelength conversion member and comprising a light path adjustment mechanism which guides, to the reflective surface, light returned from the wavelength conversion member to the light-emitting surface; and a lightguide opposed to the wavelength conversion member.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated in the drawings schematically, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

FIG. 1 is a schematic perspective view of a display device of the present embodiment.

A display device DSP comprises a display panel PNL, a drive integrated circuit (IC) chip IC which drives the display panel PNL, an illumination device BL which illuminates the display panel PNL, a control module CM, flexible printed circuits FPC1 and FPC2, etc. In the present embodiment, a first direction X is, for example, a direction of the short sides of the display panel PNL. A second direction Y is a direction crossing the first direction X, namely a direction of the long sides of the display panel PNL. A third direction Z is a direction crossing each of the first direction X and the second direction Y.

The display panel PNL comprises a first substrate 100 and a second substrate 200 opposed to the first substrate 100. The display panel PNL has a display area DA in which an image is displayed, and a frame-shaped non-display area NDA located around the display area DA.

The illumination device BL is disposed to be opposed to the first substrate 100 side of the display panel PNL. The illumination device BL comprises an illumination surface IA on a side opposed to the first substrate 100. The illumination device BL emits light from the illumination surface IA toward the display panel PNL. The illumination surface IA is formed to cover the entire display area DA. In other words, the display panel PNL is disposed to be opposed to the illumination surface IA of the illumination device EL.

The drive IC chip IC is mounted on the first substrate 100 of the display panel PNL. The flexible printed circuit FPC1 is mounted on the first substrate 100 and connects the display panel PNL to the control module CM. The flexible printed circuit FPC2 connects the illumination device EL to the control module CM. The control module CM outputs a signal necessary for driving the display panel PNL through the flexible printed circuit FPC1 and outputs a signal necessary for driving the illumination device BL through the flexible printed circuit FPC2.

The display device DSP of such a structure is a transmissive display device having a transmissive display function of displaying an image by selectively transmitting light incident on the display panel PNL from the illumination device BL. However, the present embodiment is not limited to the transmissive display device. For example, the display device DSP may be a reflective display device having a reflective display function of displaying an image by selectively reflecting external light or fill light incident on the display panel PNL. The display device DSP may also be a transreflective display device having both the transmissive display function and the reflective display function. If the display device DSP is a reflective display device and requires the illumination device BL, the illumination device BL is disposed such that the illumination surface IA is opposed to the second substrate 200 side. The display device DSP is not limited to the liquid crystal display device and may be, for example, a display device comprising a mechanical display panel in which a micro-electromechanical systems (MEMS) shutter is provided in each pixel.

FIG. 2 is a cross-sectional view of the display device. FIG. 2 shows a cross-section including pixels of three different colors as an example. FIG. 2 shows a liquid crystal display device in a display mode using a lateral electric field as an example. However, a display mode applicable to the display device DSP of the present embodiment is not particularly limited and may be a display mode using a longitudinal electric field.

The display panel PNL comprises a liquid crystal layer LQ between the first substrate 100 and the second substrate 200. The display panel PNL comprises a first optical element OD1 on a surface on the first substrate 100 side and a second optical element OD2 on a surface on the second substrate 200 side.

The first substrate 100 comprises a first insulating substrate 10, a first switching element SW1, a second switching element SW2, a third switching element SW3, a first insulating film 11, a common electrode CE, a second insulating film 12, a first pixel electrode PE1, a second pixel electrode PE2, a third pixel electrode PE3, a first alignment film AL1 and the like. In the following description of the first substrate 100, a side opposed to the liquid crystal layer LQ is defined as the upper side.

The first insulating substrate 10 is formed of an insulating and light transmissive material such as glass or resin. The first to third switching elements SW1 to SW3 are disposed on the first insulating substrate 10. In the example illustrated, the first to third switching elements SW1 to SW3 are disposed in areas corresponding to the first to third pixels PX1 to PX3, respectively. The first insulating film 11 is disposed on the first insulating substrate 10 and the first to third switching elements SW1 to SW3.

The common electrode CE is disposed on the first insulating film 11. The common electrode CE is formed of a transparent conductive material such as indium tin oxide (ITO) or indium zinc oxide (IZO). The second insulating film 12 is disposed on the common electrode CE.

The first to third pixel electrodes PE1 to PE3 are disposed on the second insulating film 12 and opposed to the common electrode CE through the second insulating film 12. Slits SLA are formed in each of the first to third pixel electrodes PE1 to PE3. The first to third pixel electrodes PE1 to PE3 are disposed in the areas corresponding to the first to third pixels PX1 to PX3, respectively. The first pixel electrode PE1 is electrically connected to the corresponding first switching element SW1 in a position not shown in FIG. 2. Similarly, the second pixel electrode PE2 and the third pixel electrode PE3 are electrically connected to the second switching element SW2 and the third switching element SW3, respectively. The first to third pixel electrodes PE1 to PE3 are formed of a transparent conductive material such as ITO or IZO. The first alignment film AL1 covers the second insulating film 12, the first to third pixel electrodes PE1 to PE3 and the like. In the example illustrated, the first alignment film AL1 is formed of a material having a horizontal liquid crystal alignment property and disposed on a surface of the first substrate 100 in contact with the liquid crystal layer LQ.

The second substrate 200 comprises a second insulating substrate 20, a light shielding layer BM, a first color filter CF1, a second color filter CF2, a third color filter CF3, an overcoat layer OC, a second alignment film AL2 and the like.

The second insulating substrate 20 is formed of an insulating and light transmissive material such as glass or resin. The light shielding layer BM and the first to third color filters CF1 to CF3 are disposed on a side of the second insulating substrate 20 opposed to the first substrate 100. The ends of each of the first to third color filters CF1 to CF3 are opposed to the light shielding layer BM. The first to third color filters CF1 to CF3 are disposed in the areas corresponding to the first to third pixels PX1 to PX3, respectively. In other words, the first color filter CF1 is opposed to the first pixel electrode PE1. Similarly, the second color filter CF2 and the third color filter CF3 are opposed to the second pixel electrode PE2 and the third pixel electrode PE3, respectively. For example, the first color filter CF1 is a red filter, the second color filter CF2 is a green filter and the third color filter CF3 is a blue filter. Each color filter is not particularly limited and may be, for example, a yellow or colorless filter. The overcoat layer OC covers the first to third color filters CF1 to CF3. The second alignment film AL2 covers the overcoat layer OC. In the example illustrated, the second alignment film AL2 is formed of a material having a horizontal liquid crystal alignment property and disposed on a surface of the second substrate 200 in contact with the liquid crystal layer LQ. The first alignment film AL1 and the second alignment film AL2 are formed of, for example, polyimide subjected to an alignment treatment such as a rubbing treatment or a photoalignment treatment. The liquid crystal layer LQ is disposed between the first alignment film AL1 and the second alignment film AL2.

For example, the first optical element OD1 is disposed between the first insulating substrate 10 and the illumination device BL, and comprises a first polarizer PL1. For example, the second optical element OD2 is disposed on a side of the second insulating substrate 20 opposite to a side on which the liquid crystal layer LQ is located, and comprises a second polarizer PL2. The absorption axis of the first polarizer PL1 and the absorption axis of the second polarizer PL2 are, for example, orthogonal to each other.

Next, operation of the display device DSP is described by citing a normally-black mode as an example. It should be noted that the normally-black mode means a display mode in which pixels produce a black display in an off-state where no voltage is applied to pixel electrodes and the pixels produce a white display in an on-state where a voltage is applied to the pixel electrodes.

Light emitted from the illumination surface IA of the illumination device BL is transmitted through the first polarizer PL1 and made incident on the display panel PNL as, for example, linearly polarized incident light. In the pixels in the off-state, the polarization direction of the light incident on the display panel PNL is maintained. As a result, the light transmitted through the display panel PNL is absorbed by the second polarizer PL2 which is in a crossed Nicol positional relationship with the first polarizer PL1.

In contrast, in the on-state, the polarization direction of the incident light is rotated 90° when transmitting through the display panel PNL under the influence of a phase difference of the liquid crystal layer LQ. That is, the polarization direction of the transmitted light is parallel to the transmission axis of the second polarizer PL2. As a result, the light is transmitted through the second polarizer PL2.

Next, a structure of the illumination device BL is described with reference to FIG. 3 to FIG. 5.

FIG. 3 is a plan view showing the structure of the illumination device of the present embodiment.

The illumination device BL comprises a light source unit 30, an optical member 40, a wavelength conversion member 50 and a lightguide LG. For example, the light source unit 30 extends in the first direction X. The optical member 40 extends in the first direction X and is located between the light source unit 30 and the wavelength conversion member 50 in the second direction Y. The wavelength conversion member 50 extends in the first direction X and is located between the optical member 40 and the lightguide LG in the second direction Y. The lightguide LG is formed into a rectangular plate in an X-Y plane defined by the first direction X and the second direction Y, and opposed to the wavelength conversion member 50 in the second direction Y.

The light source unit 30 comprises a fixing member 32 and light-emitting elements 34. The fixing member 32 extends in the first direction X and fixes the light-emitting elements 34. The fixing member 32 is formed of, for example, white resin, and comprises a first reflective surface 32a on a side opposed to the optical member 40. The light-emitting elements 34 are formed of, for example, light-emitting diodes (LEDs) The light-emitting elements 34 are disposed on the side of the light source unit 30 opposed to the optical member 40 and spaced out in the first direction X. In the example illustrated, the fixing member 32 is located between adjacent light-emitting elements 34. Each light-emitting element 34 comprises a frame 35 and a light-emitting portion 36. Each frame 35 is formed of, for example, white resin, and comprises a second reflective surface 35a on a side opposed to the optical member 40. Each light-emitting portion 36 comprises a light-emitting surface 36a on a side opposed to the optical member 40. In the example illustrated, the first reflective surface 32a, the second reflective surfaces 35a and the light-emitting surfaces 36a are disposed in the first direction X. That is, the first reflective surface 32a of the fixing member 32 and second reflective surfaces 35a of adjacent light-emitting elements 34 are located between light-emitting surfaces 36a of the adjacent light-emitting elements 34. It should be noted that the first reflective surface 32a and the second reflective surfaces 35a may be bent or deviated from the light-emitting surfaces 36a in the second direction Y. For example, the light-emitting element 34 is an LED package and the frame 35 is a reflector. In this case, the light-emitting portion 36 is constituted by an LED chip, a sealing member covering the LED chip and the like.

The first reflective surface 32a and the second reflective surfaces 35a have higher optical reflectivity than the light-emitting surfaces 36a and form a reflective surface of the present embodiment together. However, the reflective surface is not limited to the first reflective surface 32a and the second reflective surfaces 35a, and may be formed of another member disposed between the light source unit 30 and the optical member 40 or formed on a surface of the optical member 40 opposed to the light source unit 30.

The optical member 40 comprises a light path adjustment mechanism 42. The light path adjustment mechanism 42 guides, to the reflective surface, light returned from the wavelength conversion member 50 to be described later to the light-emitting surfaces 36a. In the example illustrated, the light path adjustment mechanism 42 is formed on a side of the optical member 40 opposed to the light source unit 30. However, the light path adjustment mechanism 42 may be formed on a side of the optical member 40 opposed to the wavelength conversion member 50 or formed inside the optical member 40 by providing a low refractive resin or air layer inside the optical member 40. The light path adjustment mechanism 42 is, for example, a concave lens and a convex lens. In the example illustrated, the light path adjustment mechanism 42 comprises a concave portion 42A opposed to the light-emitting surface 36a and a convex portion 42B opposed to the first reflective surface 32a in the X-Y plane. For example, the concave portion 42A is a concave lens formed by a curved surface and farthest from the light source unit 30 at a position opposed to the light-emitting surface 36a. For example, the convex portion 42B is a convex lens formed by a curved surface and nearest to the light source unit 30 at a position opposed to the first reflective surface 32a.

In the example illustrated, the optical member 40 comprises a concave portion 44 also in a Y-Z plane defined by the second direction Y and the third direction Z. The concave portion 44 extends in the first direction X. The shape of the concave portion 44 will be described later in detail with reference to cross-sectional views. The optical member 40 is formed of, for example, a transparent glass or resin material.

The wavelength conversion member 50 comprises a light-emitting material 52 which is, for example, a photoluminescent material. That is, the light-emitting material 52 absorbs light of a specific wavelength and emits light of a longer wavelength than the absorbed light. As the light-emitting material 52, for example, yellow, green and red light-emitting materials that absorb blue and ultraviolet light and emit light of respective colors may be used. The light-emitting material 52 can be selected from various fluorescent materials having a light emission property suitable for the embodiment. The light-emitting material 52 is not limited to only one type of light-emitting material and may comprise two or more types of light-emitting material.

In the example illustrated, the light-emitting material 52 is formed of quantum dots. The quantum dots are semiconductor crystals having an external dimension of, for example, several nanometers to several tens of nanometers. The quantum dots of the present embodiment are formed of, for example, a group II-VI semiconductor or group III-V semiconductor having a wurtzite or sphalerite crystalline structure. The quantum dots are formed in, for example, a core-shell structure. The core is located at the center of each quantum dot and is formed of, for example, cadmium selenide (CdSe), cadmium telluride (CdTe), indium phosphide (InP) or the like. The shell covers the surrounding of the core to stabilize the core physically and chemically. The surrounding of the shell may be modified by an organic molecule. The shell is formed of, for example, zinc sulfide (ZnS), cadmium sulfide (CdS) or the like. The quantum dots have emission wavelength selectivity depending on the type and size of the semiconductor of the core. Quantum dots having a suitable emission wavelength can thereby be formed.

The light-emitting material 52 is sealed in a sealing member 54, for example, in a state of being dispersed into suitable binder resin or solvent. The sealing member 54 is, for example, a tubular body extending in the first direction X, but is not particularly limited to this. The sealing member 54 can be formed of glass or resin. If a material susceptible to deterioration from oxygen and water is selected as the light-emitting material 52, the sealing member 54 should preferably be formed of an airtight and low moisture permeability material such as a glass tube. A cross-section of the sealing member 54 along the Y-Z plane is, for example, rectangular, but the shape is not particularly limited and may be a circle or other polygons.

The optical member 40 and the wavelength conversion member 50 are formed independently but may be formed integrally. For example, the light-emitting material 52 may be sealed in the optical member 40. The wavelength conversion member 50 and lightguide LG are formed independently but may be formed integrally. For example, the light-emitting material 52 may be sealed in the lightguide LG.

Figure 4A:
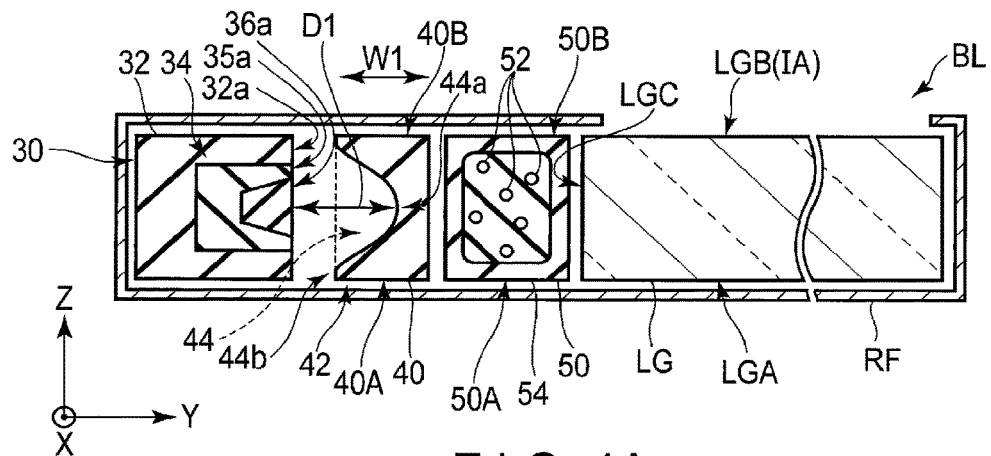
FIG. 4A is a cross-sectional view seen along A-A of the illumination device of FIG. 3 including the center of a light-emitting surface.
Figure 4B:
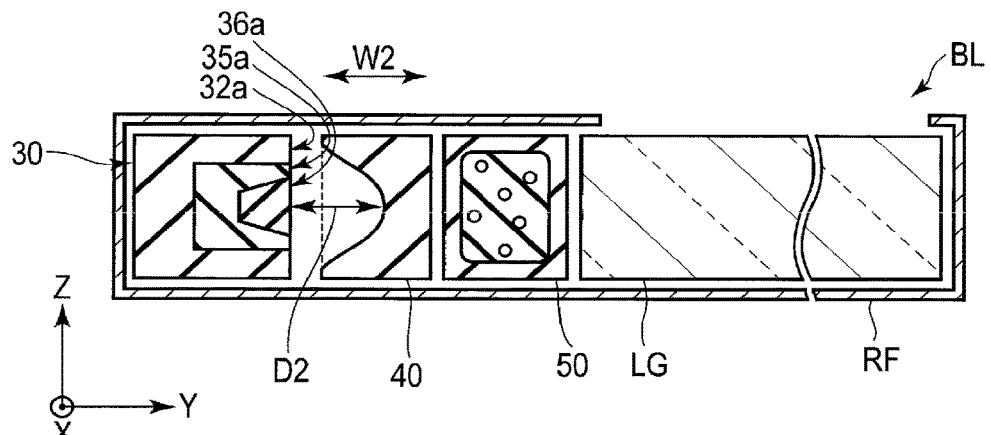
FIG. 4B is a cross-sectional view seen along B-B of the illumination device of FIG. 3 including an end of the light-emitting surface.
Figure 4C:
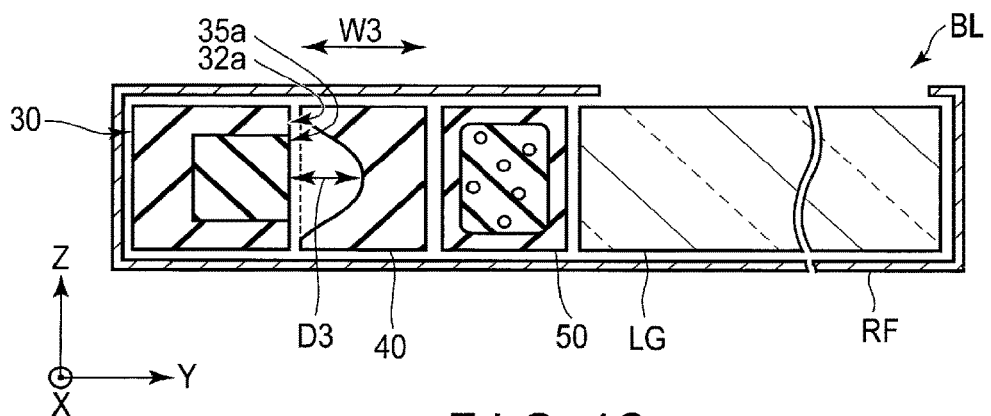
FIG. 4C is a cross-sectional view seen along C-C of the illumination device of FIG. 3 including a second reflective surface.

Next, a brief description of the illumination device BL is provided with reference to FIG. 4A to FIG. 4C.

FIG. 4A is a cross-sectional view seen along A-A of the illumination device of FIG. 3 including the center of the light-emitting surface. FIG. 4B is a cross-sectional view seen along B-B of the illumination device of FIG. 3 including the end of the light-emitting surface. FIG. 4C is a cross-sectional view seen along C-C of the illumination device of FIG. 3 including the second reflective surface.

The light source unit 30, the optical member 40, the wavelength conversion member 50 and the lightguide LG are disposed in the second direction Y. In the light source unit 30, the first reflective surface 32a of the fixing member 32 and the second reflective surface 35a and the light-emitting surface 36a of the light-emitting element 34 are located on the side opposed to the optical member 40 and, for example, flush with each other. In the optical member 40, the light path adjustment mechanism 42 and the concave portion 44 are located on the side opposed to the light source unit 30. The concave portion 44 comprises a bottom portion 44a in a position opposed to the light-emitting surface 36a and top portions 44b on both sides of the bottom portion 44a in the third direction Z. The top portions 44b protrude toward the first reflective surface 32a. In the concave portion 44, a curved surface including the bottom portion 44a and the top portions 44b form a concave lens. The concave portion 44 is, for example, an air layer, but may be filled with a material having lower refractivity than a material forming the body of the optical member 40. In Y-Z cross-sections shown in FIG. 4A to FIG. 4C, the light source unit 30 and the optical member 40 are away from each other.

The optical member 40 comprises a lower surface 40A and an upper surface 40B along the X-Y plane. The wavelength conversion member 50 comprises a lower surface 50A and an upper surface 50B along the X-Y plane. The lightguide LG comprises a lower surface LGA and an upper surface LGB along the X-Y plane and a side surface LGC along the X-Z plane. In the lightguide LG, the side surface LGC corresponds to an entry surface on which light emitted from the light source unit 30 is made incident, and the upper surface LGB corresponds to the illumination surface IA illuminating the display panel PNL (not shown). In the Y-Z plane shown in FIG. 4A to FIG. 4C, the wavelength conversion member 50 is away from the optical member 40 and the lightguide LG, but is not particularly limited and may be in contact with the optical member 40 or the lightguide LG or bonded to the optical member 40 or the lightguide LG by adhesive, etc.

The illumination device BL comprises a reflector RF. The reflector RF is opposed to the lower surface 40A and the upper surface 40B of the optical member 40 and the lower surface 50A and the upper surface 50B of the wavelength conversion member 50. The reflector RF is also opposed to the lower surface LGA of the lightguide LG. The reflector RF is further opposed to an area between the light source unit 30 and the optical member 40. The reflector RF is formed integrally in one example, but is not limited to this and may be constituted by separate members opposed to the respective parts (the light source unit 30, the optical member 40, the wavelength conversion member 50 and the lightguide LG). The reflector RF may be formed into a sheet or thin films formed on the respective surfaces. The reflector RF is formed of a material having high optical reflectivity, for example, a multi-layer dielectric film or a metal material such as aluminum.

A distance D1 shown in FIG. 4A is a distance between the bottom portion 44a and the center of the light-emitting surface 36a in the second direction Y. A width W1 is a width of the upper surface 40B of the optical member 40 in the second direction Y in the Y-Z plane including the center of the light-emitting surface 36a. A distance D2 shown in FIG. 4B is a distance between the bottom portion 44a and the end of the light-emitting surface 36a in the second direction Y. A width W2 is a width of the upper surface 40B of the optical member 40 in the second direction Y in the Y-Z plane crossing the end of the light-emitting surface 36a. A distance D3 shown in FIG. 4C is a distance between the bottom portion 44a and the second reflective surface 35a in the second direction Y. A width W3 is a width of the upper surface 40B of the optical member 40 in the second direction Y in the Y-Z plane crossing the second reflective surface 35a. Distance D1 is longer than distance D2, and distance D2 is longer than distance D3. In the same manner, a distance between the light source unit 30 and the optical member 40 in the second direction Y is the longest in the position shown in FIG. 4A, and becomes shorter in the order of the position shown in FIG. 4B and the position shown in FIG. 4C. Width W3 is greater than width W2, and width W2 is greater than width W1.

FIG. 5 is an illustration of a positional relationship between the light source unit and the wavelength conversion member when viewed from the lightguide side.

As described above, the first reflective surface 32a, the second reflective surfaces 35a and the light-emitting surfaces 36a are disposed in the first direction X and also in the third direction Z. That is, the reflective surface including the first reflective surface 32a and the second reflective surfaces 35a is formed around the light-emitting surfaces 36a. The wavelength conversion member 50 is opposed to all of the light-emitting surfaces 36a, the first reflective surface 32a and the second reflective surfaces 35a in the X-Z plane.

Next, operation of the illumination device BL is described with reference to FIG. 6.

FIG. 6 is an illustration of paths of light emitted from the wavelength conversion member. FIG. 6 shows a cross-section of the illumination device BL including the center of the light-emitting surface 36*a* and parallel to the X-Y plane.

The light source unit 30 emits light L1 from the light-emitting surface 36*a* toward the wavelength conversion member 50. Light L1 emitted from the light-emitting surface 36*a* is transmitted through the optical member 40 and then made incident on the wavelength conversion member 50, and part of light L1 is absorbed into the light-emitting material 52. Light L11, which is part of light L1 not absorbed into the light-emitting material 52, is emitted from the illumination surface IA through the lightguide LG. The light-emitting material 52 absorbs part of light L1 and emits light of a longer wavelength than light L1. At this time, the light-emitting material 52 emits light in all directions. For example, light L21 subjected to wavelength conversion by the light-emitting material 52 is emitted from the wavelength conversion member 50 to the lightguide LG. On the other hand, light L22 subjected to wavelength conversion by the light-emitting material 52 is returned from the wavelength conversion member 50 to the light source unit 30. It should be noted that part of the wavelength-converted light emitted from the light-emitting material 52 is directed to the lower surface 50A and the upper surface 50B of the wavelength conversion member 50 but is reflected by the reflector RF to the wavelength conversion member 50.

Light L21 is emitted from the illumination surface IA through the lightguide LG. Light L22 is made incident on the optical member 40, then refracted in the first direction X in the concave portion 42A of the light path adjustment mechanism 42, deviated from the light-emitting surface 36*a* opposed to the concave portion 42A and guided to the first reflective surface 32*a* or the second reflective surface 35*a*. Light L2 reflected by the first reflective surface 32*a* or the second reflective surface 35*a* is made incident on the optical member 40 again and guided to the lightguide LG through the wavelength conversion member 50. Light L22 transmitted from the wavelength conversion member 50 toward the convex portion 42B of the optical member 40 is directed to the first reflective surface 32*a* or the second reflective surface 35*a* opposed to the convex portion 42B without being refracted toward the light-emitting surface 36*a*.

Accordingly, light emitted from the illumination device BL is a mixture of light L11 emitted from the light source unit 30, light L21 subjected to wavelength conversion and emitted from the wavelength conversion member 50 and light L2 emitted from the wavelength conversion member 50 and reflected by the reflective surface.

For example, the light-emitting element 34 is formed of a blue LED and the wavelength conversion member 50 comprises green and red light-emitting materials 52. The green light-emitting material 52 absorbs blue light L1 and emits green light. The red light-emitting material 52 absorbs blue light L1 and emits red light. Therefore, the illumination device BL is a surface illumination device that emits white light which is a mixture of blue, green and red light. The wavelength conversion member 50 may comprise a yellow light-emitting material 52. In this case, the illumination device BL is a surface illumination device that emits white light which is a mixture of blue and yellow light.

As described above, according to the present embodiment, the illumination device BL comprises the light source unit 30 comprising the light-emitting element 34 having the light-emitting surface 36*a*, the reflective surface (first and second reflective surfaces 32*a* and 35*a*) formed around the light-emitting surface 36*a*, and the optical member 40 located between the light source unit 30 and the wavelength conversion member 50. Since the optical member 40 comprises the light path adjustment mechanism 42 which guides wavelength-converted and returned light L22 to the reflective surface, the illumination device BL can prevent light L22 from being absorbed into the light-emitting portion 36. That is, according to the present embodiment, the illumination device BL capable of improving light use efficiency can be provided. Further, according to the present embodiment, the display device DSP comprises the display panel PNL opposed to the illumination surface IA of the illumination device BL. Since the display device DSP is a non-selfluminous display device that displays an image using light from the illumination device BL, the illumination device BL excellent in light use efficiency can improve brightness of the display device DSP. Therefore, according to the display device DSP of the present embodiment, images can be displayed at the same brightness level as a conventional display device even if power supplied to the illumination device BL is reduced. That is, according to the present embodiment, the display device DSP of low power consumption can be provided.

According to the present embodiment, since the wavelength conversion member 50 comprises the light-emitting material 52, the wavelength of light can be tuned by changing the light-emitting material. According to the present embodiment, the light-emitting material 52 is formed of quantum dots. In comparison with a generally used fluorescent material, a peak in a spectrum of light emitted from a quantum dot is sharp and thus the wavelength of light can be fine-tuned more precisely. That is, according to the present embodiment, the illumination device BL can expand the color gamut.

According to the present embodiment, the optical member 40 is located between the light-emitting surface 36*a* and the wavelength conversion member 50. Therefore, the light-emitting material 52 is insulated from the influence of heat from the light-emitting surface 36*a* in comparison with a structure where the light-emitting surface 36*a* is adjacent to the wavelength conversion member 50. Therefore, according to the present embodiment, the illumination device BL can suppress thermal deterioration of the light-emitting material 52.

According to the present embodiment, since the light path adjustment mechanism 42 is formed on the light source unit 30 side of the optical member 40, returned light guided to the reflective surface by the light path adjustment mechanism 42 can be prevented from being scattered inside the optical member 40 and directed to the light-emitting surface 36*a* again.

According to the present embodiment, since the light-emitting element 34 is formed of a blue LED and the wavelength conversion member 50 comprises green and red light-emitting materials, the tone of white light can be fine-tuned by changing the type and density of the green and red light-emitting materials.

According to the present embodiment, since the reflector RF is opposed to the upper surface 40B of the optical member 40 and the upper surface 50B of the wavelength conversion member 50 in the third direction Z, the entire light emitted from the illumination surface IA is transmitted through the lightguide LG. Therefore, color unevenness of the illumination surface IA can be reduced.

Next, a modified example of the present embodiment is described. In the modified example described below, portions equivalent to those of the embodiment are denoted by the same reference numbers and detailed explanation is omitted, such explanation being mainly given to portions different from those of the embodiment.

Figure 7:
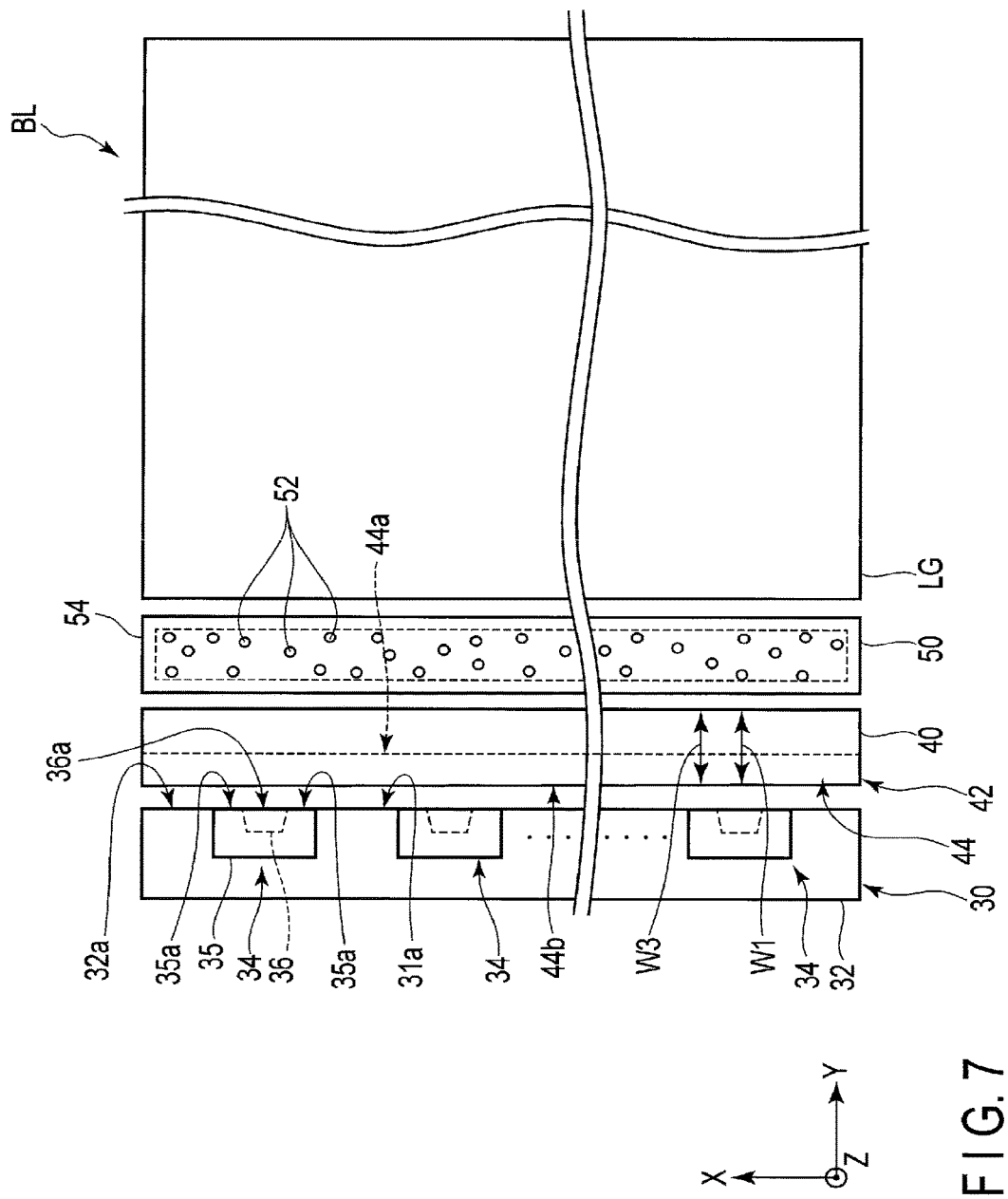
FIG. 7 is a plan view showing a modified example of the illumination device.

FIG. 7 is a plan view showing a modified example of the illumination device.

The modified example is different from the embodiment shown in FIG. 3 in that the concave portion 42A opposed to the light-emitting surface 36a and the convex portion 42B opposed to the first reflective surface 32a are not provided in the X-Y plane, and width W1 and width W3 of the upper surface 40B of the optical member 40 in the second direction Y are equal to each other.

Even in such a modified example, the aforementioned effect can be achieved. Further, according to the modified example, since the light path adjustment mechanism 42 has the same structure in the first direction X, there is no need to adjust a position of the optical member 40 in the first direction X with respect to the light-emitting element 34 when disposing the optical member 40. That is, according to the modified example, the illumination device BL having easy-to-dispose members can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An illumination device comprising:
   a light source unit comprising a light-emitting element comprising a light-emitting surface;
   a reflective surface formed around the light-emitting surface and having higher optical reflectivity than the light-emitting surface;
   a wavelength conversion member which converts a wavelength of emitted light from the light-emitting surface;
   an optical member located between the light source unit and the wavelength conversion member and comprising a light path adjustment mechanism which guides, to the reflective surface, light returned from the wavelength conversion member to the light-emitting surface; and
   a lightguide opposed to the wavelength conversion member.

2. The illumination device of claim 1, wherein
the wavelength conversion member comprises a light-emitting material which absorbs the emitted light and emits light of a longer wavelength than the emitted light.

3. The illumination device of claim 2, wherein
the light-emitting material is formed of a quantum dot.

4. The illumination device of claim 1, wherein
the light path adjustment mechanism is formed on a side of the optical member opposed to the light source unit.

5. The illumination device of claim 1, wherein
the light path adjustment mechanism is a concave lens opposed Lo the light-emitting surface.

6. The illumination device of claim 1, wherein
the light-emitting element is formed of a blue light-emitting diode, and
the wavelength conversion member comprises at least one of a yellow light-emitting material, a green light-emitting material and a red light-emitting material.

7. The illumination device of claim 1, further comprising a reflector opposed to the optical member and the wavelength conversion member.

8. The illumination device of claim 1, further comprising a fixing member which fixes the light-emitting element,
wherein the reflective surface is formed on a surface of the fixing member opposed to the optical member.

9. The illumination device of claim 8, wherein the fixing member is formed of white resin.

10. A display device comprising an illumination device and a display panel illuminated by the illumination device,
    wherein the illumination device comprises:
    a light source unit comprising a light-emitting element comprising a light-emitting surface;
    a reflective surface formed around the light-emitting surface and having higher optical reflectivity than the light-emitting surface;
    a wavelength conversion member which converts a wavelength of emitted light from the light-emitting surface;
    an optical member located between the light source unit and the wavelength conversion member and comprising a light path adjustment mechanism which guides, to the reflective surface, light returned from the wavelength conversion member to the light-emitting surface; and
    a lightguide opposed to the wavelength conversion member.

11. The display device of claim 10, wherein
the display panel comprises first, second and third color filters having different colors.

12. The display device of claim 10, wherein
the lightguide comprises:
an entry surface on which emitted light from the light source unit is made incident; and
an illumination surface which crosses the entry surface and illuminates the display panel.

13. The display device of claim 10, wherein
the wavelength conversion member comprises a light-emitting material which absorbs the emitted light and emits light of a longer wavelength than the emitted light.

14. The display device of claim 13, wherein
the light-emitting material is formed of a quantum dot.

15. The display device of claim 10, wherein
the light path adjustment mechanism is formed on a side of the optical member opposed to the light source unit.

16. The display device of claim 10, wherein
the light path adjustment mechanism is a concave lens opposed to the light-emitting surface.

17. The display device of claim 10, wherein
the light-emitting element is formed of a blue light-emitting diode, and
the wavelength conversion member comprises at least one of a yellow light-emitting material, a green light-emitting material and a red light-emitting material.

18. The display device of claim 10, further comprising a reflector opposed to the optical member and the wavelength conversion member.

19. The display device of claim 10, further comprising a fixing member which fixes the light-emitting element,
wherein the reflective surface is formed on a surface of the fixing member opposed to the optical member.

20. The display device of claim 19, wherein
the fixing member is formed of white resin.

* * * * *